United States Patent Office 3,163,518
Patented Dec. 29, 1964

---

3,163,518
METHOD OF LIBERATING SILICA
FROM IRON ORE
Raymond L. Cavanagh, Willowdale, Ontario, and Anthony J. Last, Rexdale, Ontario, Canada, assignors to Ontario Research Foundation
No Drawing. Filed Sept. 5, 1962, Ser. No. 221,425
6 Claims. (Cl. 75—1)

This invention relates to a method of liberating silica from siliceous iron ore concentrates.

Various methods have been used for the removal of the greater part of the silica occurring in an iron ore concentrate. A great deal of experimental work has been done in the past in developing crushing and grinding techniques to effect a maximum liberation of silica particles from the ore. Also attempts have been made to effect thermal shattering of silica and ore particles by subjecting the same to high temperatures and rapid heating. Other methods of removing silica from iron ore involve the chemical attack of the silica itself such as by sodium hydroxide. All such prior methods have been used separately heretofore, each as a main mechanism for effecting separation of silica from the ore and as such has required the utilization of special and expensive equipment in order to obtain the optimum results from the particular method used. Any one or two of the methods is not capable of delivering a so called super-concentrate of less than say ½ of 1% of silica by weight or less than 1/10 of 1% without extreme and special costly refinements not adaptable to large scale operations.

According to this invention it has been observed that each of the prior methods of silica liberation or removal is somewhat limited as to its practical optimum degree of effectiveness. For example, chemical attack of the particles is only wholly effective if all of the silica particles are consumed by chemical attack. It is not ordinarily practical to do this. Again in crushing and grinding techniques only so much can be accomplished in the liberation of silica from the ore particles, that is their separation by physical force. The efficiency of such method is not complete in practice. Finally it has been observed that the thermal shattering of silica particles while tending to effect their separation from other ore particles is not wholly effective in effecting such separation. Through perceiving these limitations and in discovering according to this invention quite unexpectedly that chemical attack of silica with sodium hydroxide especially progresses by effecting deterioration of the grain boundaries thus weakening them, it has become apparent as set forth herein that the combination of these ways of liberating silica grains having regard to the herein discovered weakening of grain boundaries by chemical action renders a much more highly efficient liberation of silica grains than heretofore and achieves a main object of this invention.

It is another object of this invention to subject silica containing ore concentrates to chemical attack in the areas of the boundaries of the grains of silica while subjecting the same to some degree of thermal shattering at a temperature between 500° Fahrenheit and about 750° Fahrenheit and then controllably cooling the same in such manner to prevent excessive reoxidation and effecting agitation as by light grinding thus to complete liberation of the silica particles by any conventional and non-special equipment at pressures less than about 100 pounds per square inch, that is at low pressure, it being intended that the term low pressure may mean atmospheric pressure and finally to separate the liberated silica from the ore by by known separating methods.

With the foregoing and other objects in view the invention generally concerns the herein method of liberating silica from iron ore comprising the steps in combination of: comminuting said ore to particle sizes exposing surfaces of the silica grains therein and to about minus 65 mesh screen size having regard to the structure of the ore; mixing said comminuted ore with sodium hydroxide in an amount between about 1 and about 14 percent by weight of said ore having regard to silica distribution therein; subjecting said mixture to a temperature between about 500° Fahrenheit and about 750° Fahrenheit at a low pressure between respectively about 100 pounds per square inch and normal atmospheric pressure and in the presence of substantially sufficient water to take said sodium hydroxide into solution to thereby effect weakening of the grain boundaries of silica by chemical attack and effect weakening of said grains and grain boundaries by thermal shattering due to physical forces arising from a difference in thermal coefficient expansion of silica grains and other ore particles; thereafter controllably cooling said mixture; agitating said cooled mixture by light grinding to liberate the silica grains weakened at their grain boundaries from other particles of the ore; and separating said ore particles from said liberated silica grains, said chemical attack, said thermal shattering and said agitation steps each being of a relatively low order of intensity and combining to effect the liberation of substantially all silica particles the grain boundaries of which have been weakened by chemical attack.

Other objects of the invention will be appreciated by a study of the following specification.

In order to practice this invention it is first desirable to ensure that the ore has been ground to obtain a concentrate in which the silica particles present surfaces adapted to be attacked. This depends somewhat on the ore structure and will be realized with most iron ores if the silica containing concentrate is ground to less than about 65 mesh screen size. This may even be described as the starting material wherein the contained silica grains are desired to be liberated according to the methods herein.

In examining the leaching of silica from iron ores it was discovered in the case of a caustic soda leach especially that the chemical attack on the silica grains proceeded first by way of an attack on the grain boundaries or surfaces. This was revealed from numerous experiments and was unexpected from the history of the prior art. While examination of grain boundary deterioration revealed that this could well be another method of liberating a silica particle without requiring the presence of sufficient sodium hydroxide to take the entire silica particles into solution it appeared that the efficiency of the method would nevertheless have some limitations if utilized alone as had been experienced in the practice of any of the prior methods previously referred to as a sole means of liberating silica.

The combination of a low order chemical attack with a low order thermal shattering and low order grinding according to this invention brought out surprising effects and overall improved silica grain liberating efficiency.

*Example 1.*—An Eastern Ontario black rock iron ore concentrate of minus 65 mesh 10% silica was mixed with flake sodium hydroxide in a dry state in an amount of 4% of sodium hydroxide to the weight of the concentrate. The mixture was then subjected to super-heated steam as a sole source of heat and water at a temperature of 750° Fahrenheit for a period of twenty minutes within a closed vessel whereby the steam would be permitted to inhibit reoxidation and also to assist in the chemical attack on the silica grain boundaries of the grains. The thus treated mixture was then controllably cooled by dumping into water at 50° Fahrenheit and agitated. The iron magnetite grains were allowed to settle and after collection were subjected to agitation by means of a light wet grind. After magnetic separation to remove the remainder of the liberated particles it was found that the resulting concentrate had a silica content of 4%.

*Example 2.*—The same method steps as described in Example 1 were practiced on a Quebec Cartier iron ore concentrate of minus 65 mesh containing initially 3% silica. The amount of sodium hydroxide used was the same as in Example 1 and the following treatments similar, resulting in a final silica content of $\frac{1}{10}$ of 1% after removal of the liberated silica particles by magnetic separation.

*Example 3.*—An Ungava iron ore concentrate of minus 65 mesh and 1% silica by weight was similarly treated with sodium hydroxide of the same amount by weight resulting in a final concentrate after magnetic separation as before of $\frac{3}{10}$ of 1% by weight of the final concentrate.

Other investigations have revealed that the sodium hydroxide required may usefully be two or three times the amount indicated in the above examples and it is believed that this derives from the manner of dispersion of the silica grains in the iron ore being treated. Thus in some iron ores at a given percentage of occurrence of silica therein the silica particles may be relatively fine and uniformly distributed. In another ore of the same percentage occurrence the silica grains may be more coarse. It is thought that the difference in grain size resulting in a different total area of grain particles may conceivably account for the difference in the amount of sodium hydroxide required to effect a satisfactory deterioration of the silica grain boundaries by chemical attack. There may be some other explanation, but in any case it has been discovered that about 7% by weight of the ore is a satisfactory average amount of sodium hydroxide to effect satisfactory chemical attack and weakening of the grain boundaries for worthwhile liberation of silica particles thereby. With some ores one half this amount of sodium hydroxide may be satisfactorily useful. With other ores it may even take as much as twice this amount but in any event it is evident that the amount of sodium hydroxide necessary to effect a quite effective liberation of silica grains by chemical attack combined with other method steps herein is much less than might have been predicted or suspected from an examination of prior art methods or dissolving silica grains from an ore sample as a main means of liberating silica therefrom.

It may further be pointed out that the efficiency of chemical attack seems to be aided considerably by the use of water in an amount substantially sufficient to take the sodium hydroxide into solution and supplied such as by super-heated steam. Some catalytic effect may be present and may account for the effectiveness of boundary weakening. The grain boundaries appear more to weaken than necessarily to be consumed although some consumption is evident. The above examples were operated at normal pressure though it may be preferred to operate at about 500° Fahrenheit and up to pressures of about 7 atmospheres, that is about 100 pounds per square inch. Especially however operations according to the method of this invention are best adapted to continuous processing at normal atmospheric pressure.

In achieving the objects of the invention it will be apparent that the method herein enables the direct delivery of a concentrate in one treatment according to the herein method in which the silica is reduced to values far below that occurring in concentrates delivered from other silica removing methods unless with such other methods one resorts to re-processing and special costly refinements such as flotation and the like. Furthermore the method herein enables the production of iron ore concentrates adapted for high grade melting stock and the production of iron powder with very low silica content. Yet the method herein does not involve complex refined processing, complex or expensive equipment and in its characteristics is not critical as to particular quantities, temperatures or pressures, being a moderate and combined application of three or more different effects all of which contribute to the liberation of silica grains but none of which is relied upon alone. In addition it will be apparent in referring to Example 1 as contrasted with Examples 2 and 3 set forth, it may not be required to reduce the silica content to very low values but only sufficiently to render the concentrate being processed useful say for blast furnace applications with a desired amount of retained silica as may be desired. If desired regeneration of sodium hydroxide may be practiced by known methods such as by treating the resulting silicates with slaked lime. Accordingly the method as set forth herein may be useful not only in achieving very low silica values but also in upgrading ores by a simple procedure set forth having regard to the particular application in which the ore is used.

What we claim is:

1. The method of liberating silica from siliceous iron ore containing granular silica comprising the steps in combination of: comminuting said ore to particle sizes exposing surfaces of the silica grains therein and to about minus 65 mesh screen size; mixing said comminuted ore with sodium hydroxide in an amount between about 1 and about 14 percent by weight of said ore subjecting said mixture to a temperature between about 500° Fahrenheit and about 750° Fahrenheit at a low pressure between respectively about 100 pounds per square inch and normal atmospheric pressure; simultaneously adding water to take said sodium hydroxide into solution to cause thereby weakening of the grain boundaries of silica by chemical attack and to cause weakening of said grains and grain boundaries by thermal shattering due to physical forces arising from a difference in thermal coefficient of expansion of silica grains and other ore particles; thereafter cooling said mixture; agitating said cooled mixture to liberate the silica grains weakened at their grain boundaries from other particles of the ore; and separating said ore particles from said liberated silica grains.

2. The method according to claim 1 in which steam is utilized to inhibit reoxidation during heating of said mixture and provides at least a portion of said water.

3. The method according to claim 1 in which superheated steam is applied as a source of heat to said mixture at a temperature of the order of 750° Fahrenheit and at normal pressures and said steam serves as the sole source of added water.

4. The method according to claim 1 in which steam is utilized to inhibit reoxidation during heating of said mixture and wherein said mixture is cooled by quenching in water.

5. The method according to claim 1 in which superheated steam is applied as a sole source of heat and water for said mixture at a temperature of the order of 750° Fahrenheit and at normal pressures.

6. The method according to claim 1 in which superheated steam is applied as a sole source of heat and water for said mixture at a temperature of the order of 750° Fahrenheit and at normal pressures and wherein said mixture is cooled by quenching in water.

References Cited in the file of this patent
UNITED STATES PATENTS

| | | |
|---|---|---|
| 2,952,532 | Cox | Sept. 13, 1960 |

FOREIGN PATENTS

| | | |
|---|---|---|
| 332,259 | Great Britain | Apr. 15, 1929 |
| 215,482 | Australia | May 28, 1958 |